Aug. 2, 1966  G. J. DICKEY  3,263,962
ROTOR BLADE LOCK
Filed April 22, 1965
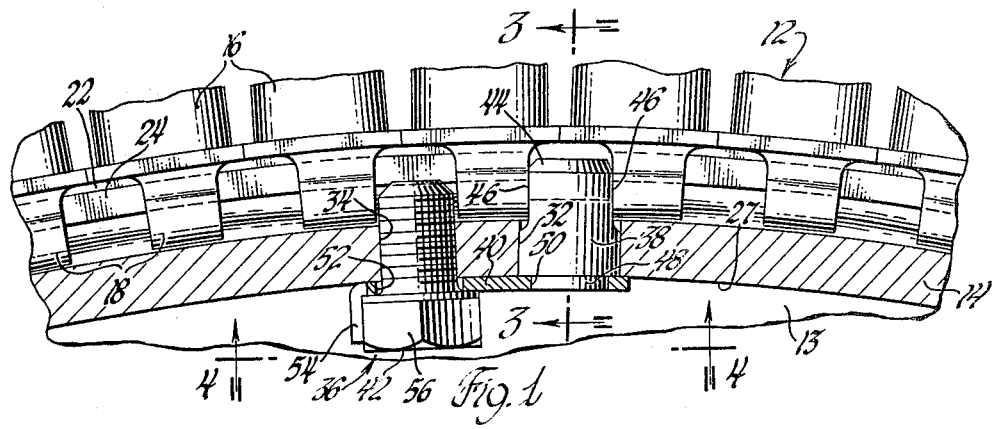
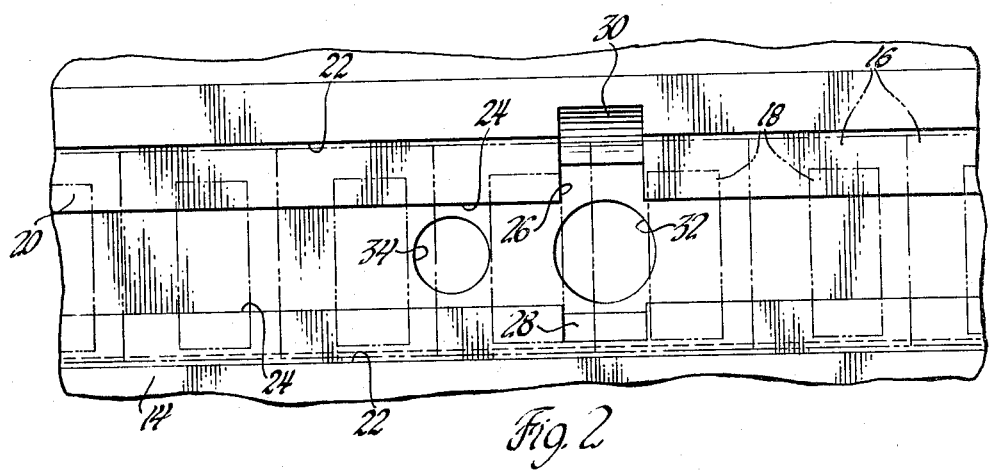
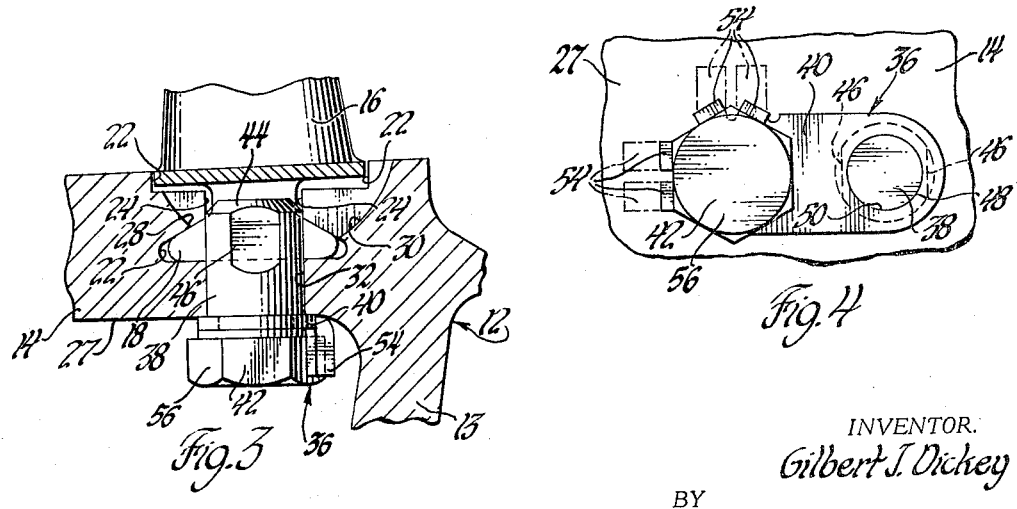
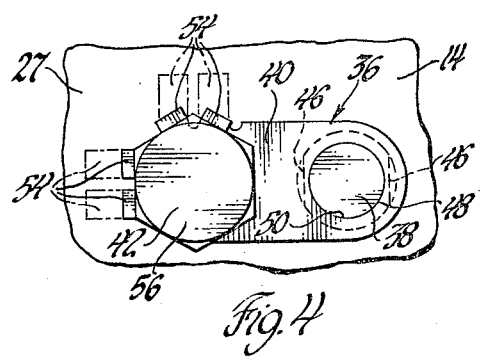
INVENTOR.
Gilbert J. Dickey
BY
Paul Fitzpatrick
ATTORNEY 3,263,962
ROTOR BLADE LOCK
Gilbert J. Dickey, Plainfield, Ind., assignor to General Motors Corporation, Detroit, Mich., a corporation of Delaware
Filed Apr. 22, 1965, Ser. No. 450,039
4 Claims. (Cl. 253—77)

This invention relates generally to a rotor blade lock and more specifically to a rotor blade lock for a rotor comprising a plurality of individually mounted blades secured in a circumferential groove in a rotor.

It is well-known in the art to assemble blades to a rotor by inserting them radially into a loading slot and sliding them circumferentially along a dovetail groove in the periphery of the rotor in order to secure the blades thereto. This type of blade attachment, however, creates the problem of devising some means to block the loading slot to prevent the blades from coming out. Previously used ways of doing this have included filling the loading slot with plastic thermosetting material, securing a member disposed in the loading slot to the rotor in some fashion, and spanning the loading slot with portions of the blades adjacent the loading slot. In this last type of rotor blade lock, some means for preventing circumferential movement of the blades must also be included so that the adjacent blades will not become aligned with the loading slot and come out. Accordingly, this invention is directed to providing novel means for closing the loading slot in a circumferential dovetail mounting groove which is simple and uncomplicated.

More specifically, the object of the invention is to provide a simple and unique device to prevent movement of the blades which span the loading slot in a rotor wheel with a circumferential retaining groove.

The exact nature of this invention as well as other objects and advantages thereof will be readily apparent from consideration of the following specification relating to the annexed drawings in which:

FIGURE 1 is a transverse section of a portion of a bladed rotor embodying a blade lock in accordance with the present invention.

FIGURE 2 is a plan view of the portion of the bladed rotor shown in FIGURE 1 with the blade platforms and roots shown in phantom to show their relationship to the loading slot.

FIGURE 3 is a cross section through the rotor showing the blade lock plug and taken substantially along the line 3—3 of FIGURE 1 looking in the direction of the arrows.

FIGURE 4 is a section taken substantially along the line 4—4 of FIGURE 1 looking in the direction of the arrows.

Referring now to FIGURE 1, there is shown a portion of a bladed rotor indicated generally at 12. The bladed rotor 12 comprises a disc support 13 with a rim 14 which carries a plurality of blades 16 with dovetail roots 18. The rim 14 has a circumferential groove 20 with lateral walls 22 provided with annular tongues 24 to give the groove 20 a mating dovetail cross section. The groove 20 includes a loading slot 26 in which the tongues 24 have segments removed therefrom providing arcuate walls 28 and 30 to accommodate the inner end of the dovetail blade roots 18 as can be seen in FIGURES 2 and 3. The width of the loading slot 26 corresponds to the width of the roots 18 so that they may be inserted radially into the loading slot 26 with the forward end of the root first being toed under wall 28 and the root 18 then being rotated into position.

In assembling the bladed rotor 12, the blades are first individually inserted into loading slot 26 in the above manner, slidably mounted on tongues 24, and rotated out of alignment with the loading slot 26 until the entire circumferential groove 20 is filled. The blades 16 are then translated circumferentially slightly so that portions of the platforms of two blades cover the loading slot 26, with their roots 18 being fully retained by the tongues 24 adjacent the loading slot 26.

An aperture 32 extends through the rim 14 from the bottom of the loading slot 26 to its inner circumferential wall 27. The aperture 32 is coaxial and substantially circumferentially coextensive with the loading slot 26. A threaded bore 34 is also provided in the rim 14 circumferentially spaced from the aperture 32 by approximately the width of a blade root 18.

The blade lock or device used to prevent circumferential movement of the blades 16 in the groove 20 is indicated generally at 36. It comprises plug 38, support 40 and bolt 42. The plug 38 is substantially circular and fits into aperture 32 with the upper end 44 extending into the loading slot 26. The upper end 44 has axial flats 46 which abut the axial faces on the blade roots 18 adjacent the loading slot 26. The lower end 48 of plug 38 is of reduced diameter to provide an annular shoulder to rest on support 40 when end 48 is mounted in aperture 50 therein.

A second aperture 52 is provided in support 40 in alignment with bore 34 so that bolt 42 will extend therethrough when it is threaded into bore 34. Two pairs of bendable lock tabs 54 are provided on support 40 adjacent aperture 52 and are shown in phantom in FIGURE 4.

After the blades 16 have been assembled to the rim 14 of rotor 12, and been moved to the position shown in FIGURE 1, plug 38 is inserted with flats 46 abutting the roots 16 of the blade roots 18 adjacent the loading slot 26 to prevent them from aligning with loading slot 26. Since the blades are provided with abutting platforms and since the plug 38 is circumferentially coextensive with the loading slot 26, substantially the entire roots 18 on the blades adjacent the loading slot will be retained by tongues 24. The plug 38 in turn is held in position by support 40 which is secured to rim 14 by bolt 42. After the bolt 42 has been threaded into bore 34, tabs 54 are bent inwardly to the solid line position in FIGURE 4 to embrace head 56 on bolt 42 to prevent it from rotating and coming loose.

Some of the readily apparent advantages of the blade lock are the spacing of the bolt 42 and plug 38 so that they both extend outwardly between blade roots. On the plug 38, this provides a greater contact surface with the blade roots while for the bolt, the spacing permits use of a longer bolt. Also, since the plug 38 is coextensive with the loading slot 26, substantially the entire blade roots adjacent the slots are retained.

Obviously, the foregoing disclosure relates only to a preferred embodiment of the invention and numerous modifications may be made without departing from the spirit and scope of the invention as set forth in the appended claims.

I claim:
1. A bladed rotor comprising:
    an annular support rim,
    a dovetail circumferential groove in the periphery of said rim, said circumferential groove including a loading slot,
    a plurality of blades having roots adapted to be inserted radially into said loading slot slidably retained in said groove, said blades having circumferentially extending platforms which abut adjacent platforms to provide circumferential spaces between said roots, the circumferential length of said loading slot, said roots and said spaces being substantially equal, said blades being disposed in said groove so that one of said spaces is aligned with said loading slot, an aperture extending through said rim in alignment with said loading slot, a plug disposed in said aperture and extending into said loading slot and said one space, axial flats on the portion of said plug extending into said loading slot, said flats abutting the axial walls of the roots adjacent said one space, a support adjacent the inner circumferential wall of said rim, said support engaging said plug to retain it in said aperture, and bolt means threadedly received by said rim and extending into the circumferential space adjacent said one space to secure said support to said rim whereby said blades are restrained from circumferential movement.

2. A bladed rotor comprising:

an annular support rim, a dovetail circumferential groove in the periphery of said rim, said circumferential groove including a loading slot, a plurality of blades having roots adapted to be inserted radially into said loading slot slidably retained in said groove, said blades having circumferentially extending platforms which abut adjacent platforms to provide circumferential spaces between said roots, the circumferential length of said loading slot, said roots and said spaces being substantially equal, said blades being disposed in said groove so that one of said spaces is aligned with said loading slot, an aperture extending through said rim in alignment with said loading slot, a plug disposed in said aperture and extending into said loading slot and said one space, axial flats on the portion of said plug extending into said loading slot, said flats abutting the axial walls of the roots adjacent said one space, a support adjacent the inner circumferential wall of said rim, said support engaging said plug to retain it in said aperture, and means to secure said support to said rim whereby said blades are restrained from circumferential movement.

3. A bladed rotor comprising:

an annular support rim, a dovetail circumferential groove in the periphery of said rim, said circumferential groove including a loading slot, a plurality of blades having roots adapted to be inserted radially into said loading slot slidably retained in said groove, said blades having circumferentially extending platforms which abut adjacent platforms to provide circumferential spaces between said roots, said blades being disposed in said groove so that one of said spaces is aligned with said loading slot, an aperture extending through said rim in alignment with said loading slot, a plug disposed in said aperture and extending into said loading slot and said one space, axial flats on the portion of said plug extending into said loading slot, said flats abutting the axial walls of the roots adjacent said one space, a support adjacent the inner circumferential wall of said rim, said support engaging said plug to retain it in said aperture, and means to secure said support to said rim whereby said blades are restrained from circumferential movement.

4. A bladed rotor comprising:

an annular support rim, a dovetail circumferential groove in the periphery of said rim, said circumferential groove including a loading slot, a plurality of blades having roots adapted to be inserted radially into said loading slot slidably retained in said groove, said blades having circumferentially extending platforms which abut adjacent platforms to provide circumferential spaces between said roots, said blades being disposed in said groove so that one of said spaces is aligned with said loading slot, an aperture extending through said rim in alignment with said loading slot, a plug disposed in said aperture and extending into said loading slot and said one space, said plug abutting the axial walls of the roots adjacent said one space, a support adjacent the inner circumferential wall of said rim, said support engaging said plug to retain it in said aperture, and means to secure said support to said rim whereby said blades are restrained from circumferential movement.

References Cited by the Examiner

UNITED STATES PATENTS

| 775,108 | 11/1904 | Elliott | 253—77 |
| 3,088,708 | 5/1963 | Feinberg | 253—77 |

FOREIGN PATENTS

| 659,592 | 10/1951 | Great Britain. |
| 827,264 | 2/1960 | Great Britain. |

EDGAR W. GEOGHEGAN, *Primary Examiner.*

SAMUEL LEVINE, *Examiner.*

E. A. POWELL, *Assistant Examiner.*